(12) United States Patent
Williams et al.

(10) Patent No.: US 10,152,870 B1
(45) Date of Patent: Dec. 11, 2018

(54) COMPLIANCE DETECTION

(71) Applicant: Lytx, Inc., San Diego, CA (US)

(72) Inventors: Christopher S. Williams, San Diego, CA (US); Michael Shirey, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 207 days.

(21) Appl. No.: 15/049,951

(22) Filed: Feb. 22, 2016

(51) Int. Cl.
*G08B 21/00* (2006.01)
*G08B 21/02* (2006.01)
*G01B 21/04* (2006.01)
*G08B 21/04* (2006.01)
*H04N 7/18* (2006.01)
*B60Q 9/00* (2006.01)
*B60R 11/04* (2006.01)

(52) U.S. Cl.
CPC ........... *G08B 21/0476* (2013.01); *B60Q 9/00* (2013.01); *H04N 7/183* (2013.01); *B60R 11/04* (2013.01)

(58) Field of Classification Search
CPC ..... B60W 2050/0077; B60W 2540/28; B60W 30/08; B60W 40/09; G06Q 40/08; G60R 1/06
See application file for complete search history.

(56) References Cited

U.S. PATENT DOCUMENTS

| | | | |
|---|---|---|---|
| 8,930,072 B1* | 1/2015 | Lambert | G07C 5/0866 348/222.1 |
| 2008/0189142 A1* | 8/2008 | Brown | G06Q 10/00 705/4 |
| 2009/0135009 A1* | 5/2009 | Little | G06Q 10/00 340/540 |
| 2014/0051041 A1* | 2/2014 | Stefan | G09B 19/167 434/65 |
| 2015/0009010 A1* | 1/2015 | Biemer | G06F 21/32 340/5.83 |

* cited by examiner

*Primary Examiner* — Nathnael Aynalem
(74) *Attorney, Agent, or Firm* — Van Pelt, Yi & James LLP

(57) ABSTRACT

A system for determining compliance includes an input interface and a processor. The input interface is for receiving an exterior camera data of a vehicle. The processor is for: identifying a person associated with the vehicle based at least in part on the exterior camera data; determining whether the person is complying with a safety rule; and in the event that the person is not complying, indicating that the person is not complying.

28 Claims, 10 Drawing Sheets

COMPLIANCE DETECTION

BACKGROUND OF THE INVENTION

Modern vehicles (e.g., airplanes, boats, trains, cars, trucks, etc.) can include a vehicle event recorder in order to better understand the risks and inefficiencies associated with vehicles and their drivers. A vehicle event recorder typically includes a set of sensors, e.g., video recorders, audio recorders, accelerometers, gyroscopes, vehicle state sensors, GPS (global positioning system), etc., that report data, which is used to determine the occurrence of these risks and inefficiencies by recording anomalous events. Sensor data can then be transmitted to an external reviewing system. Anomalous event types include accident anomalous events, maneuver anomalous events, location anomalous events, proximity anomalous events, vehicle malfunction anomalous events, driver behavior anomalous events, or any other anomalous event types. One class of problems leading to risks and inefficiencies are violation of compliance with rules.

BRIEF DESCRIPTION OF THE DRAWINGS

Various embodiments of the invention are disclosed in the following detailed description and the accompanying drawings.

DETAILED DESCRIPTION

Figure 1:
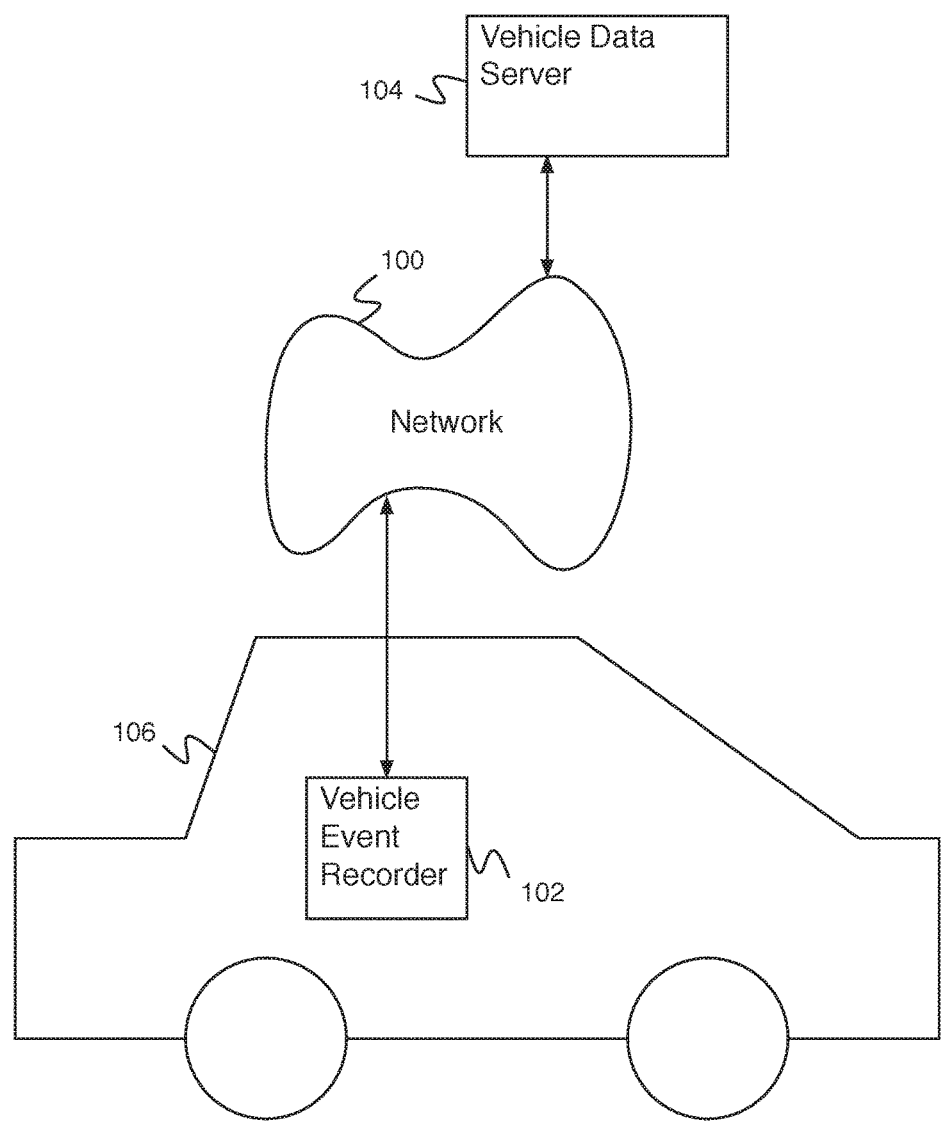
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for determining compliance comprises an input interface for receiving an exterior camera data of a vehicle and a processor for identifying a person associated with the vehicle based at least in part on the exterior camera data, determining whether the person is complying with a safety rule, and in the event that the person is not complying, indicating that the person is not complying. In some embodiments, the system additionally comprises a memory coupled to the processor and configured to provide the processor with instructions.

In some embodiments, a system for determining compliance comprises a vehicle event recorder comprising a processor and a memory. The vehicle event recorder is coupled to a set of sensors (e.g., audio sensors, video sensors, accelerometers, gyroscopes, global positioning system sensors, vehicle state sensors, a wearable sensor, etc.) for recording vehicle data. The vehicle event recorder receives external camera data and identifies a person associated with the vehicle based at least in part on the sensor data. The vehicle event recorder then determines whether the person is complying with a safety rule, and in the event the person is not complying, the vehicle event recorder indicates that the person is not complying. In some embodiments, the vehicle event recorder determines the body position of the person and observes the changes in body position of the person to identify when the person is lifting an object and to determine whether the person is lifting with their back straight (e.g., lifting in a safe manner). In various embodiments, complying with the safety rule comprises lifting with their back straight, wearing proper gear, performing a safety action (e.g., placing a safety cone before walking behind the vehicle, etc.), or performing any other appropriate compliance action. In some embodiments, determining whether the person is complying with a safety rule is based at least in part on a vehicle state (e.g., on a vehicle state determined from vehicle state sensors).

In various embodiments, the system monitors events and behavior outside of driving such as loading and unloading procedures, theft, safety process measures, operational policy, time and motion studies, or any other appropriate monitoring.

In some embodiments, the system for determining compliance is triggered to monitor for movement. For example, monitoring for movement occurs in the event that the vehicle has stopped for a period of time, been shut off, entered in to a specific area (e.g., geo fenced, etc.), or any other appropriate reason. In various embodiments, a person is identified using one or more cameras mounted in or around the vehicle. In various embodiments, cameras in a facility or surrounding area are used (e.g., as authenticated and connected wirelessly to the vehicle). In some embodiments, a wearable sensor is used in an identification process. In some embodiments, a wearable sensor comprises a beacon (e.g., to assist a camera in identification). In various embodiments, the person's position is determined by identifying joints or limbs, their positions and orientations, or using any other appropriate position detection.

In various embodiments, safety compliance monitoring of a person comprises one or more of the following: 1) if they look to be lifting something, ensure that they are using correct lifting bio mechanics; 2) if they look to be moving quickly, ensure that they are not running; 3) if they are carrying something, make sure they are doing it safely; 4) if they are moving things, make sure they are using required tools (e.g., using a hand truck); 5) if they are required to keep a hand on a side arm when approaching another vehicle, ensure that they are doing so; 6) if they are required to be wearing a high visibility vest, hard hat, or other visible safety gear, ensure that they are doing so; or any other appropriate monitoring.

In some embodiments, preemptive feedback is provided—for example, in the event that a person (e.g., the vehicle driver, employee passenger, etc.) has previously had safety compliance problems, provide feedback such as audible reminders ("Remember to lift with your legs and not your back", "Remember to wear your safety helmet"), visual reminders (flashing lights, graphics on a display, etc.), haptic feedback via smart watch or mobile phone, or any other appropriate form of communication to try to reduce risk of safety compliance problems.

In various embodiments, the system records and processes the non-compliance data. For example, the system records and processes the non-compliance data by: 1) if the human is not moving like they are supposed to, not wearing appropriate safety equipment, not using required tools, etc., a video event of the non-compliance issue is captured and stored; 2) the video event is tagged with meta data such as who the user is (identified by facial recognition, RFID, or any other method), where the violation took place (GPS), date, time, and any other data that may be available and relevant; 3) the video is uploaded to a back end system; 4) the system can implement a process of human review, could automatically "score" or otherwise categorize the violation, or could do any other appropriate processing; and 5) the system can provide feedback to a driver or other employee or supervisor—for example, the non-complying individual could review the video and meta data later and could be coached, instructed, terminated, or any other appropriate action, based on the content of the video, the circumstances in which the event occurred, the individual's personal compliance, medical, employment, or other history, and the surrounding environment.

FIG. 1 is a block diagram illustrating an embodiment of a system including a vehicle event recorder. Vehicle event recorder 102 comprises a vehicle event recorder mounted in a vehicle (e.g., a car or truck). In some embodiments, vehicle event recorder 102 includes or is in communication with a set of sensors—for example, video recorders, audio recorders, accelerometers, gyroscopes, vehicle state sensors, proximity sensors, a global positioning system (e.g., GPS), outdoor temperature sensors, moisture sensors, laser line tracker sensors, or any other appropriate sensors. In some embodiments, a sensor (e.g., a camera, etc.) is external to the vehicle (e.g., mounted on a vehicle, mounted on a stationary item, etc.) but in communication with the vehicle event recorder. In various embodiments, vehicle state sensors comprise a speedometer, an accelerator pedal sensor, a brake pedal sensor, an engine revolutions per minute (e.g., RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle event recorder 102 comprises a system for processing sensor data and detecting events. In some embodiments, vehicle event recorder 102 comprises map data. In some embodiments, vehicle event recorder 102 comprises a system for detecting risky behavior. In various embodiments, vehicle event recorder 102 is mounted on vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In some embodiments, vehicle event recorder 102 comprises a processor and a memory. In various embodiments, network 100 comprises a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, or any other appropriate network. In some embodiments, network 100 comprises multiple networks, changing over time and location. In some embodiments, different networks comprising network 100 comprise different bandwidth cost (e.g., a wired network has a very low cost, a wireless Ethernet connection has a moderate cost, a cellular data network has a high cost). In some embodiments, network 100 has a different cost at different times (e.g., a higher cost during the day and a lower cost at night). Vehicle event recorder 102 communicates with vehicle data server 104 via network 100. Vehicle event recorder 102 is mounted to vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In various embodiments, vehicle data server 104 is located at a colocation center (e.g., a center where equipment, space, and bandwidth are available for rental), at a cloud service provider, or any at other appropriate location. In some embodiments, events recorded by vehicle event recorder 102 are downloaded to vehicle data server 104 when vehicle 106 arrives at the home station. In some embodiments, vehicle data server 104 is located at a remote location. In some embodiments, events recorded by vehicle event recorder 102 are downloaded to vehicle data server 104 wirelessly. In some embodiments, a subset of events recorded by vehicle event recorder 102 is downloaded to vehicle data server 104 wirelessly. In some embodiments, vehicle event recorder 102 comprises a system for determining compliance.

Figure 2:
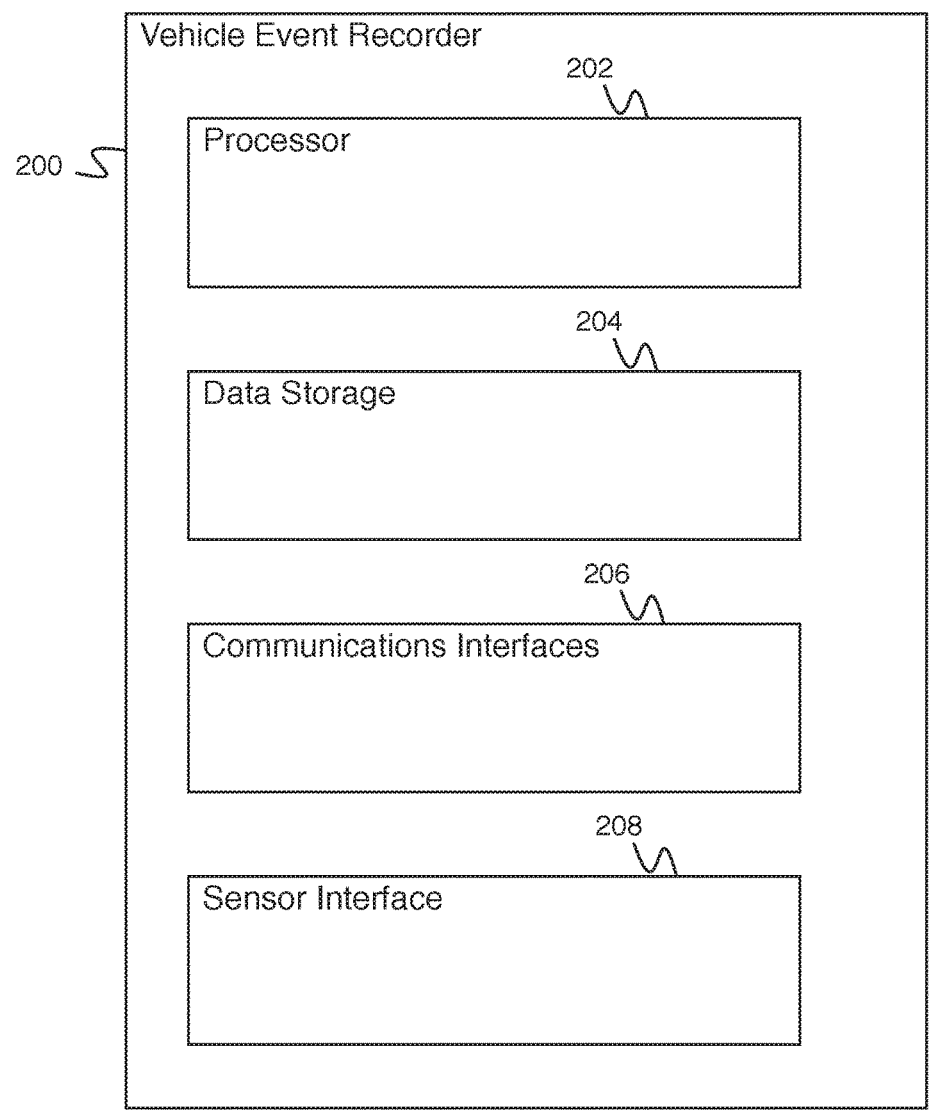
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 comprises processor 202. Processor 202 comprises a processor for controlling the operations of vehicle event recorder 200, for reading and writing information on data storage 204, for communicating via wireless communications interface 206, and for reading data via sensor interface 208. In various embodiments, processor 202 comprises a processor for determining a vehicle characterization, determining a vehicle identifier, determining a maintenance item, or for any other appropriate purpose. Data storage 204 comprises a data storage (e.g., a random access memory (RAM), a read only memory (ROM), a nonvolatile memory, a flash memory, a hard disk, or any other appropriate data storage). In various embodiments, data storage 204 comprises a data storage for storing instructions for processor 202, vehicle event recorder data, vehicle event data, sensor data, video data, driver scores, or any other appropriate data. In various embodiments, communications interfaces 206 comprises one or more of a GSM interface, a CDMA interface, a LTE interface, a WiFi™ interface, an Ethernet interface, a Universal Serial Bus (USB) interface, a Bluetooth™ interface, an Internet interface, or any other appropriate interface. Sensor interface 208 comprises an interface to one or more vehicle event recorder sensors. In various embodiments, vehicle event recorder sensors comprise an exterior video camera, an exterior still camera, an interior video camera, an interior still camera, a microphone, an accelerometer, a gyroscope, an outdoor temperature sensor, a moisture sensor, a laser line tracker sensor, vehicle state sensors, or any other appropriate sensors. In some embodiments, compliance data is received via sensor interface 208. In some embodiments, compliance data is received via communications interface 206. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a turn signal sensor, a cabin equipment operation sensor, or any other appropriate vehicle state sensors. In some embodiments, sensor interface 208 comprises an on-board diagnostics (OBD) bus (e.g., society of automotive engineers (SAE) J1939, J1708/J1587, OBD-II, CAN BUS, etc.). In some embodiments, vehicle event recorder 200 communicates with vehicle state sensors via the OBD bus. In some embodiments, vehicle event recorder 200 additionally comprises a memory coupled to processor 202. In various embodiments, the memory comprises a magnetic memory, an optical memory, a solid-state memory, a flash memory, a nonvolatile memory, a read-only memory, a tape memory, a disc memory, or any other appropriate memory.

Figure 3:
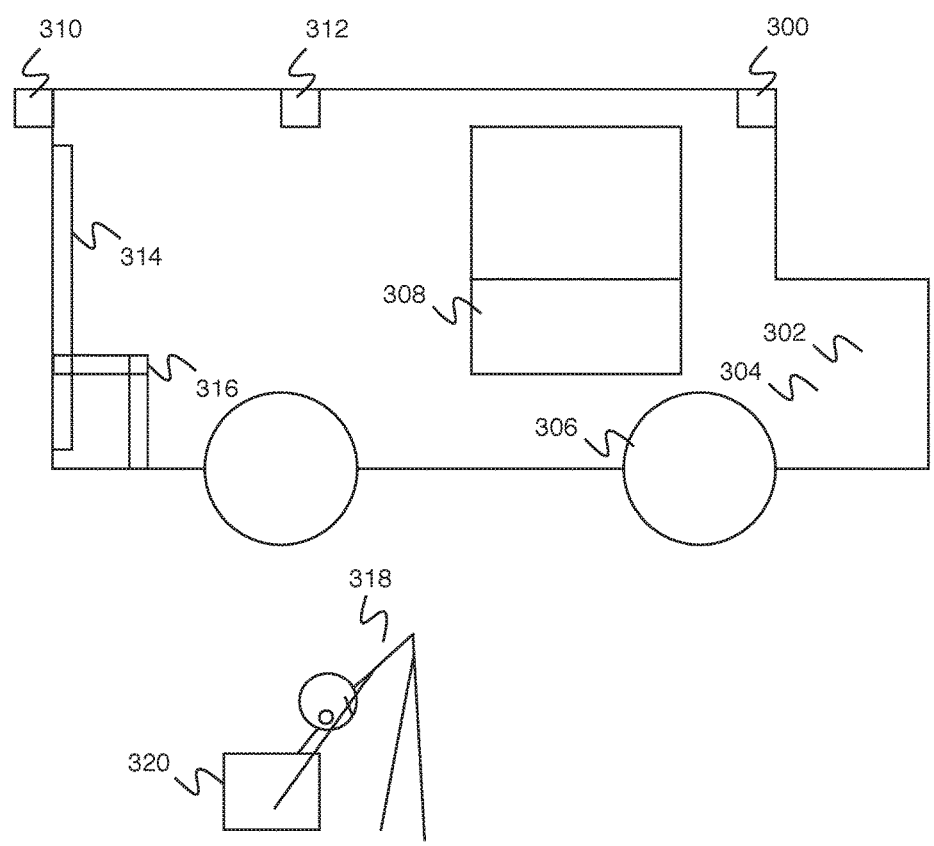
FIG. 3 is a diagram illustrating an embodiment of sensors mounted on a truck.

FIG. 3 is a diagram illustrating an embodiment of sensors mounted on a truck. In some embodiments, sensors indicated in FIG. 3 comprise vehicle state sensors. In some embodiments, sensor data from sensors indicated in FIG. 3 are used to determine a vehicle state. In the example shown, driver camera 300 comprises a camera for observing a driver. In some embodiments, driver camera 300 comprises a camera for determining whether a driver is present. Ignition sensor 302 comprises a sensor for determining whether the ignition is on (e.g., whether the engine is running). Gear sensor 304 comprises a sensor for determining whether the vehicle is in gear (e.g., ready to drive or in park). Speed sensor 306 comprises a sensor for determining vehicle speed. In some embodiments, speed sensor 306 comprises a sensor for determining whether the vehicle is moving. Door sensor 308 comprises a sensor for determining whether a door is open. In some embodiments, door sensor 308 comprises a sensor on a driver door. In some embodiments, more than one door sensor is present. Rear camera 310 comprises a camera for observing rear activity. In some embodiments, rear camera 310 comprises a sensor for determining whether there is rear activity (e.g., loading or unloading from the rear of the truck). Side camera 312 comprises a camera for observing side activity. In some embodiments, side camera 312 comprises a sensor for determining whether there is side activity (e.g., lifting or carrying boxes or equipment at the side of the truck). Rear door sensor 314 comprises a sensor for determining whether the rear door is open. Utility power sensor 316 comprises a sensor for determining whether a utility power is being used. In various embodiments, utility power is used for a lift gate, a boom lift, a jib crane, a cement mixer, or any other appropriate powered vehicle accessory. FIG. 3 additionally comprises employee 318 lifting box 320. In various embodiments, employee 318 comprises a driver, a co-driver, an employee passenger, or any other appropriate employee. In various embodiments, employee 318 is not an employee but rather a non-company employee or other unauthorized person within a safety zone. In some embodiments, the presence of the non-employee or other unauthorized person within the safety zone is brought to the attention of the driver (e.g., by indicating in a text, by turning on a warning light, by sounding an audio alarm or tone, etc.). In the example shown, employee 318 is lifting box 320 incorrectly (e.g., employee 318 is not complying with a safety rule). In some embodiments, employee 318 is observed lifting box 320 by an external camera (e.g., rear camera 310 or side camera 312). In some embodiments, employee 318 is determined to be not complying with a safety rule based at least in part on exterior camera data.

Figure 4:
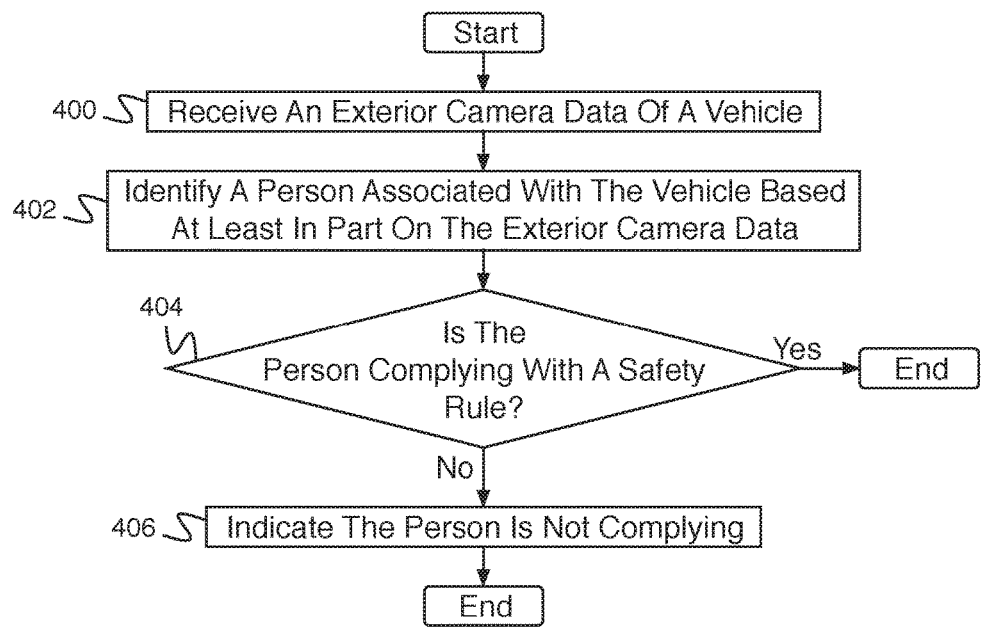
FIG. 4 is a flow diagram illustrating an embodiment of a process for determining compliance.

FIG. 4 is a flow diagram illustrating an embodiment of a process for determining compliance. In some embodiments, the process of FIG. 4 is executed by a vehicle event recorder (e.g., vehicle event recorder 102 of FIG. 1). In the example shown, in 400, exterior camera data of a vehicle is received. In various embodiments, exterior camera data comprises one or more of a front camera, a side camera, a rear camera, or any other appropriate camera. In 402, a person associated with the vehicle is identified based at least in part on the exterior camera data. In various embodiments, the person associated with the vehicle comprises a driver, a co-driver, an employee passenger, a non-company employee, an unauthorized person, or any other appropriate person associated with the vehicle. In 404, it is determined whether the person is complying with a safety rule. In some embodiments, it is determined whether the person is complying with a plurality of safety rules. In some embodiments, in 404 it is determined whether the person is complying with a general procedure not a complying with a safety rule. For example, it is determined whether the person is complying with a company procedure (e.g., monitoring procedure, etc.). In the event it is determined that the person is complying with the safety rule, the process ends. In the event it is determined that the person is not complying with the safety rule, control passes to 406. In 406, it is indicated that the person is not complying. In some embodiments, instructions for the steps of the process of FIG. 4 are stored in a memory and provided for execution by a processor coupled to the memory. In various embodiments, the memory comprises a magnetic memory, a solid-state memory, an optical memory, or any other appropriate memory.

Figure 5:
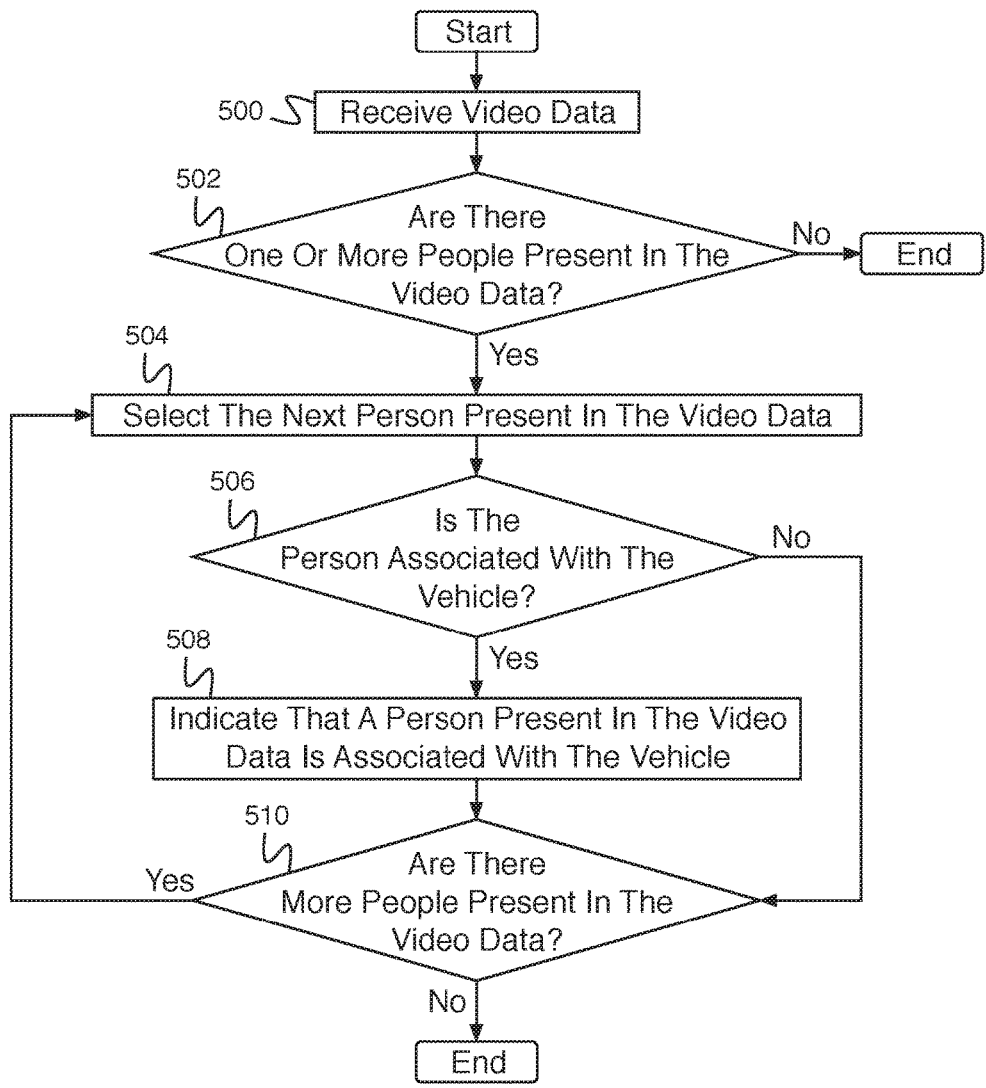
FIG. 5 is a flow diagram illustrating an embodiment of a process for identifying a person associated with a vehicle based at least in part on exterior camera data.

FIG. 5 is a flow diagram illustrating an embodiment of a process for identifying a person associated with a vehicle based at least in part on exterior camera data. In some embodiments, the process of FIG. 5 implements 402 of FIG. 4. In the example shown, in 500, video data is received. In some embodiments, video data comprises exterior camera data. In 502, it is determined whether there are one or more people present in the video data. In some embodiments, it is determined whether there are one or more people present in the video data using one or more image recognition algorithms for detecting images of people. In the event it is determined that there are not one or more people present in the video data, the process ends. In the event it is determined that there are one or more people present in the video data, control passes to 504. In 504, the next person present in the video data is selected. In some embodiments, selecting the next person present in the video data comprises selecting the first person present in the video data. In 506, it is determined whether the person is associated with the vehicle. In some embodiments, it is determined whether the person is associated with the vehicle by performing facial recognition on the images of the person and determining whether the person is recognized to be associated with the vehicle. In some embodiments, it is determined whether the person is associated with the vehicle by determining whether the person is wearing an identifying mark (e.g., an insignia on a jacket, a hat, etc.). In the event it is determined that the person is not associated with the vehicle, control passes to 510. In the event it is determined that the person is associated with the vehicle, control passes to 508. In 508, the process indicates that a person present in the video data is associated with the vehicle. In 510, it is determined whether there are more people present in the video data. In the event it is determined that there are more people present in the video data, control passes to 504. In the event it is determined that there are not more people present in the video data, the process ends.

Figure 6:
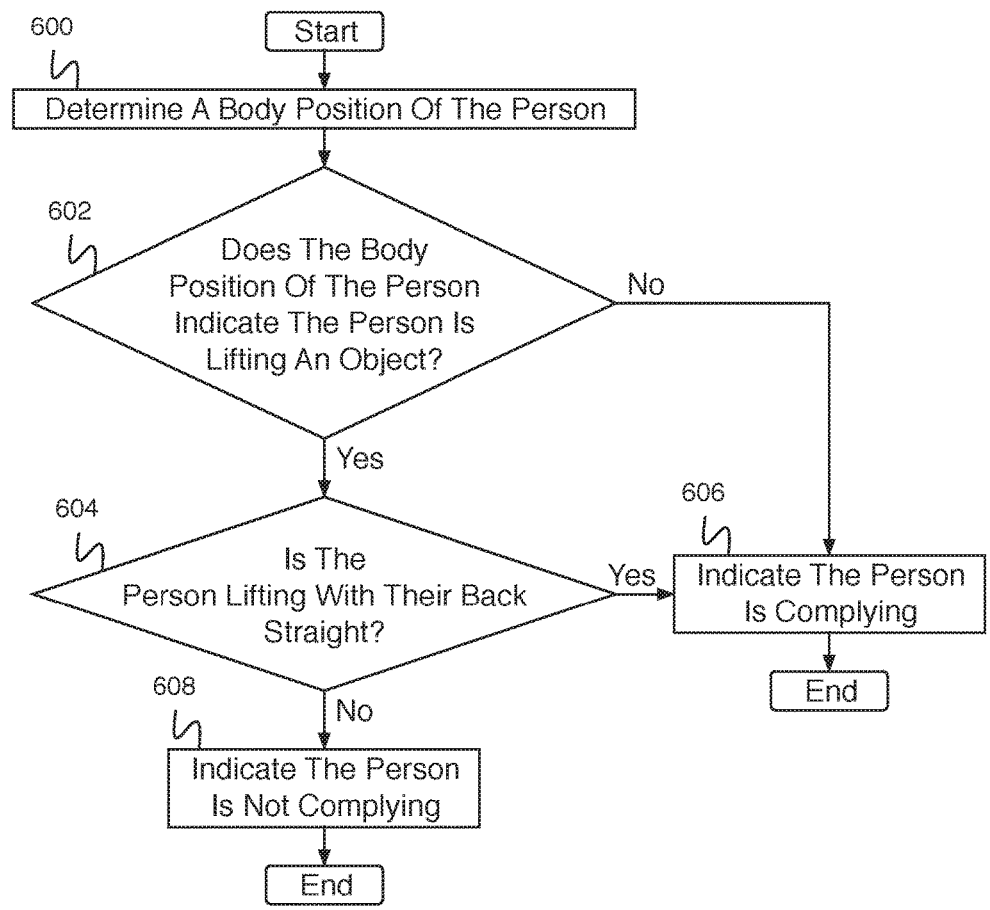
FIG. 6 is a flow diagram illustrating an embodiment of a process for determining whether a person is complying with a safety rule.

FIG. 6 is a flow diagram illustrating an embodiment of a process for determining whether a person is complying with a safety rule. In some embodiments, the process of FIG. 6 implements 404 of FIG. 4. In some embodiments, the process of FIG. 6 implements 404 of FIG. 4 in the event that the safety rule comprises lifting with the back straight. In the example shown, in 600, a body position of the person is determined. In 602, it is determined whether the body position of the person indicates the person is lifting an object. In the event it is determined that the body position of the person does not indicate the person is lifting an object, control passes to 606. In the event it is determined that the body position of the person indicates the person is lifting an object, control passes to 604. In 604, it is determined whether the person is lifting with their back straight. In the event it is determined that the person is not lifting with their back straight, control passes to 608. In the event it is determined that the person is lifting with their back straight, control passes to 606. In 606, the process indicates that the person is complying, and the process ends. In 608, the process indicates that the person is not complying, and the process ends.

Figure 7:
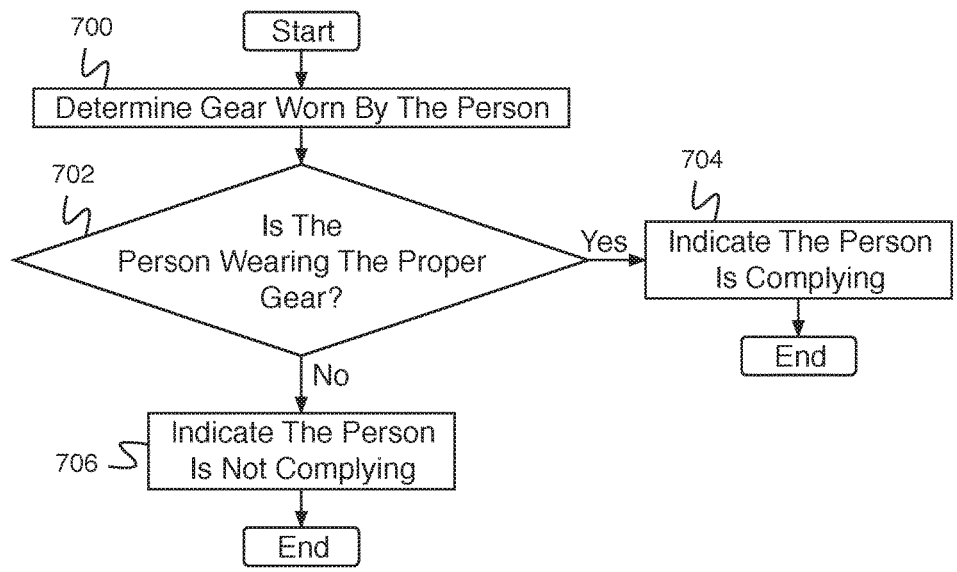
FIG. 7 is a flow diagram illustrating an embodiment of a process for determining whether a person is complying with a safety rule.

FIG. 7 is a flow diagram illustrating an embodiment of a process for determining whether a person is complying with a safety rule. In some embodiments, the process of FIG. 7 implements 404 of FIG. 4. In some embodiments, the process of FIG. 7 implements 404 of FIG. 4 in the event that the safety rule comprises wearing proper gear. In the example shown, in 700, the gear worn by the person is determined. In 702, it is determined whether the person is wearing the proper gear. In various embodiments, the proper gear comprises one or more of a vest, a hard hat, safety glasses, a respirator mask, a uniform, a badge, a dosimeter, boots, or any other appropriate gear. In the event it is determined that the person is not wearing the proper gear, control passes to 706. In 706, the process indicates that the person is not complying, and the process ends. In the event it is determined in 702 that the person is complying, control passes to 704. In 704, the process indicates that the person is complying, and the process ends.

Figure 8:
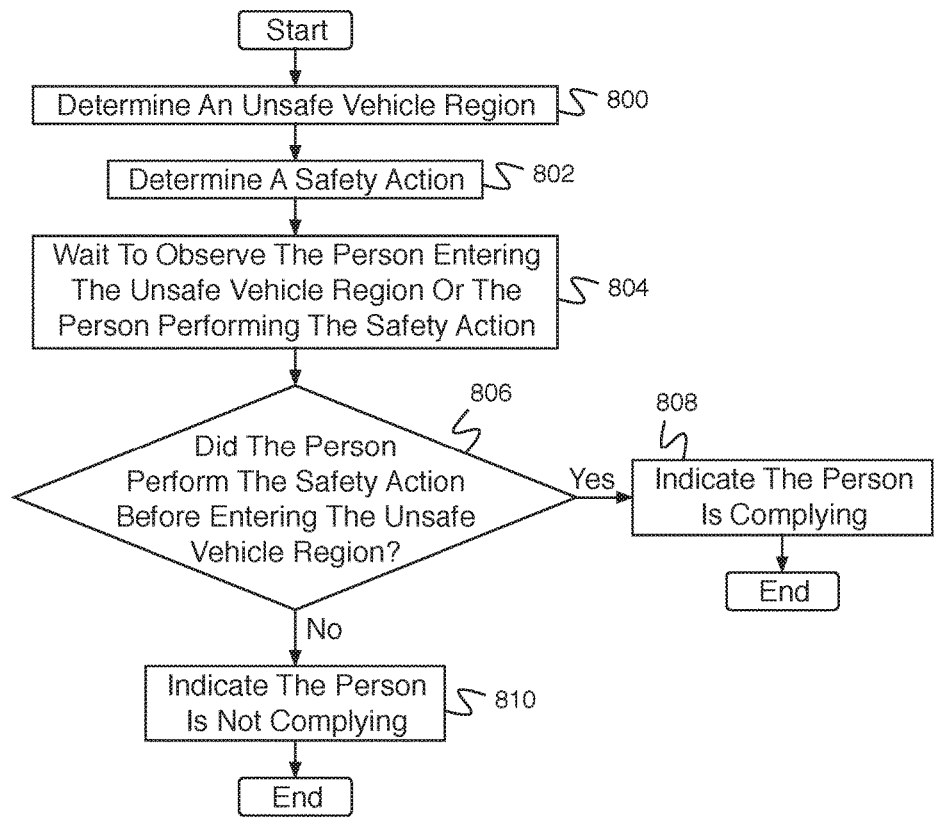
FIG. 8 is a flow diagram illustrating an embodiment of a process for determining whether a person is complying with a safety rule.

FIG. 8 is a flow diagram illustrating an embodiment of a process for determining whether a person is complying with a safety rule. In some embodiments, the process of FIG. 8 implements 404 of FIG. 4. In some embodiments, the process of FIG. 8 implements 404 of FIG. 4 in the event that the safety rule comprises performing a safety action. In the example shown, in 800, an unsafe vehicle region is determined. In some embodiments, an unsafe vehicle region comprises a region near the vehicle where it is unsafe for the person to go before performing a safety action. In various embodiments, the unsafe vehicle region comprises the region behind the vehicle, the region under the vehicle, the region between the vehicle and traffic, or any other appropriate vehicle region. In 802, a safety action is determined. In some embodiments, a safety action causes the unsafe vehicle region to become safe. In various embodiments, the safety action comprises placing a stop block, putting out a cone, setting the parking brake, or any other appropriate safety action. In 804, the process waits to observe the person entering the unsafe vehicle region or the person performing the safety action. In some embodiments, exterior camera data is monitored until the person entering the unsafe vehicle region is detected or the person performing the safety action is detected. In 806, it is determined whether the person performed the safety action before entering the unsafe vehicle region. In the event it is determined that the person did not perform the safety action before entering the unsafe vehicle region, control passes to 810. In 810, the process indicates the person is not complying, and the process ends. In the event it is determined that the person performed the safety action before entering the unsafe vehicle region, control passes to 808. In 808, the process indicates the person is complying, and the process ends.

Figure 9:
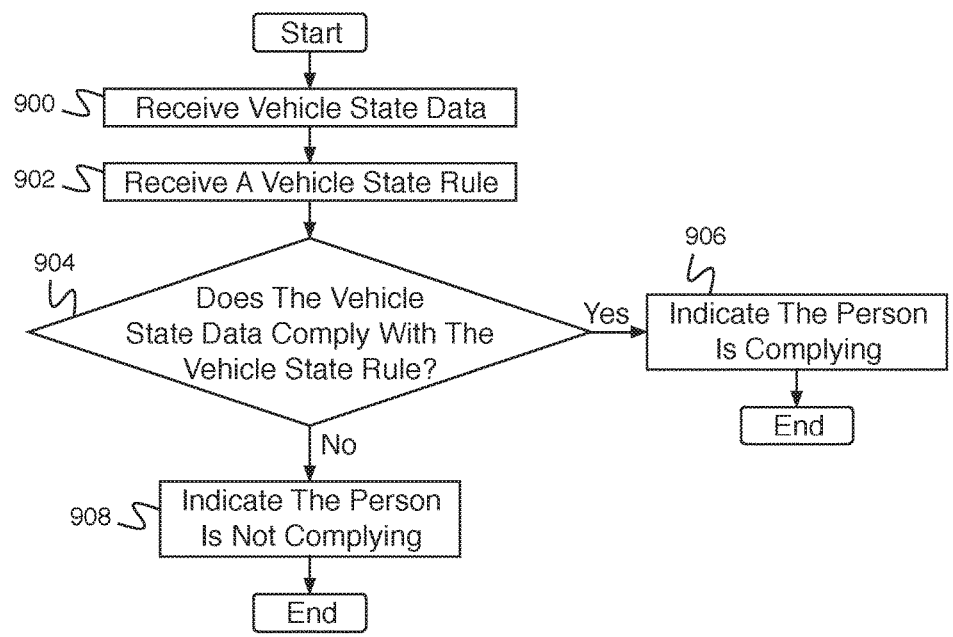
FIG. 9 is a flow diagram illustrating an embodiment of a process for determining whether a person is complying with a safety rule.

FIG. 9 is a flow diagram illustrating an embodiment of a process for determining whether a person is complying with a safety rule. In some embodiments, the process of FIG. 9 implements 404 of FIG. 4. In some embodiments, the process of FIG. 9 implements 404 of FIG. 4 in the event that determining whether a person is complying with a safety rule is based at least in part on a vehicle state. In the example shown, in 900, vehicle state data is received. In various embodiments, vehicle state data comprises lift gate data, rear door data, equipment power data, stop block data, or any other appropriate data. In some embodiments, stop block data is received from a stop block detector (e.g., a visual stop block detector, a physical stop block detector, a radio frequency identification (e.g., RFID) stop block detector, or any other appropriate stop block detector). In 902, a vehicle state rule is received. In some embodiments, a vehicle state rule comprises a rule indicating when vehicle state data indicates a person is complying with a safety rule. In various embodiments, a vehicle state rule indicates that the lift gate is to be raised before the person enters the cab, the rear door is to be closed before the person enters the cab, the equipment power is to be turned off before the person enters the cab, the stop block is to be placed before the person walks behind the vehicle, or any other appropriate vehicle state rule. In 904, it is determined whether the vehicle state data complies with the vehicle state rule. In the event it is determined that the vehicle state data does not comply with the vehicle state rule, control passes to 908. In 908, the process indicates that the person is not complying, and the process ends. In the event it is determined in 904 that the vehicle state data complies with the vehicle state rule, control passes to 906. In 906, the process indicates that the person is complying, and the process ends.

In various embodiments, vehicle state data comprises a daily vehicle safety data, maintenance inspection data before operation, truck or vehicle restraint system data (e.g., door lock data, seat belt data, etc.), or any other appropriate data.

Figure 10:
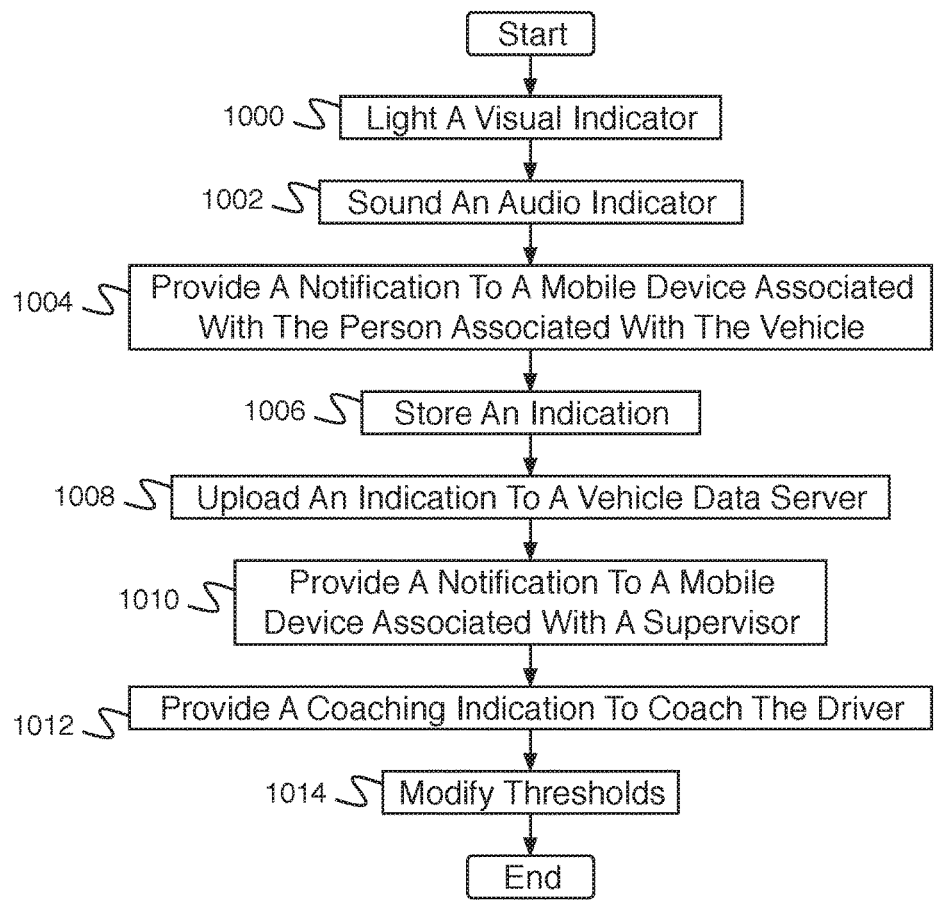
FIG. 10 is a flow diagram illustrating an embodiment of a process for indicating a person is not complying or results of non-compliance.

FIG. 10 is a flow diagram illustrating an embodiment of a process for indicating a person is not complying or results of non-compliance. In some embodiments, the process of FIG. 10 implements 406 of FIG. 4. In various embodiments, the process executes any or all of the steps of FIG. 10. In the example shown, in 1000, a visual indicator is lit (e.g., a light mounted on the vehicle event recorder is turned on). In 1002, an audio indicator is sounded (e.g., a speaker mounted on the vehicle event recorder beeps, buzzes, etc.). In 1004, a notification is provided to a mobile device (e.g., a smartphone, a tablet computer, etc.) associated with the person associated with the vehicle. In 1006, an indication is stored. In 1008, an indication is uploaded to a vehicle data server (e.g., a vehicle data server as in vehicle data server 104 of FIG. 1). In 1010, a notification is provided to a mobile device associated with a supervisor. In 1012, a coaching indication to coach the driver is provided. In 1014, thresholds (e.g., sensor data thresholds for detection of anomalous events) are modified.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining compliance, comprising:
an input interface for receiving an exterior camera data of a vehicle; and
a hardware processor for:
in response to a detected vehicle state, identifying a person associated with the vehicle, based at least in part on the exterior camera data;
identifying changes in body positions of the person based at least in part on the exterior camera data;
determining whether the person is complying with a safety rule based at least in part on the identified changes in body positions of the person; and
in the event that the person is not complying: indicating that the person is not complying.

2. The system of claim 1, wherein the person comprises a driver.

3. The system of claim 1, wherein the person comprises an employee passenger.

4. The system of claim 1, wherein the person comprises a co-driver.

5. The system of claim 1, wherein complying with the safety rule comprises lifting with a straight back.

6. The system of claim 1, wherein complying with the safety rule comprises wearing proper gear.

7. The system of claim 6, wherein the proper gear comprises a vest.

8. The system of claim 6, wherein the proper gear comprises a hard hat.

9. The system of claim 6, wherein the proper gear comprises safety glasses.

10. The system of claim 6, wherein the proper gear comprises a respirator mask.

11. The system of claim 6, wherein the proper gear comprises a uniform.

12. The system of claim 6, wherein the proper gear comprises a badge.

13. The system of claim 6, wherein the proper gear comprises a dosimeter.

14. The system of claim 6, wherein the proper gear comprises boots.

15. The system of claim 1, wherein complying with the safety rule comprises performing a safety action.

16. The system of claim 15, wherein the safety action comprises putting out a cone.

17. The system of claim 15, wherein the safety action comprises placing a stop block.

18. The system of claim 1, wherein determining whether the person is complying with a safety rule is based at least in part on the vehicle state.

19. The system of claim 18, wherein the vehicle state comprises a lift gate state.

20. The system of claim 18, wherein the vehicle state comprises a rear door state.

21. The system of claim 18, wherein the vehicle state comprises an equipment power state.

22. The system of claim 18, wherein the vehicle state comprises a stop block state.

23. A method for determining compliance, comprising:
receiving an exterior camera data of a vehicle;
in response to a detected state of the vehicle, identifying, using a hardware processor, a person associated with the vehicle, based at least in part on the exterior camera data;
identifying changes in body positions of the person based at least in part on the exterior camera data;
determining whether the person is complying with a safety rule based at least in part on the identified changes in body positions of the person; and
in the event that the person is not complying: indicating that the person is not complying.

24. A computer program product for determining compliance, the computer program product being embodied in a non-transitory computer readable storage medium and comprising computer instructions for:
receiving an exterior camera data of a vehicle;
in response to a detected state of the vehicle, identifying a person associated with the vehicle, based at least in part on the exterior camera data;
identifying changes in body positions of the person based at least in part on the exterior camera data;
determining whether the person is complying with a safety rule based at least in part on the identified changes in body positions of the person; and
in the event that the person is not complying: indicating that the person is not complying.

25. The system of claim 1, wherein the processor is further configured to identify at least one of a joint and a limb, and the identification of the changes in body positions of the person is based at least in part on the identified at least one of a joint and a limb.

26. The system of claim 1, wherein the processor is further configured to output preemptive feedback prior to determining whether the person is complying with a safety rule, based at least on part on a compliance history of the person.

27. The system of claim 1, wherein the detected state of the vehicle includes the vehicle being stopped for a period of time, the vehicle is shut off, the vehicle entered into a geographical area.

28. The system of claim 1, wherein the determination of whether the person is complying with a safety rule includes determining that the person is at least one of: lifting with a straight back, wearing gear, or performing a safety action.

* * * * *